Oct. 8, 1940.                   L. O. GROVES                  2,217,050
                                  FAUCET
                             Filed Oct. 15, 1938
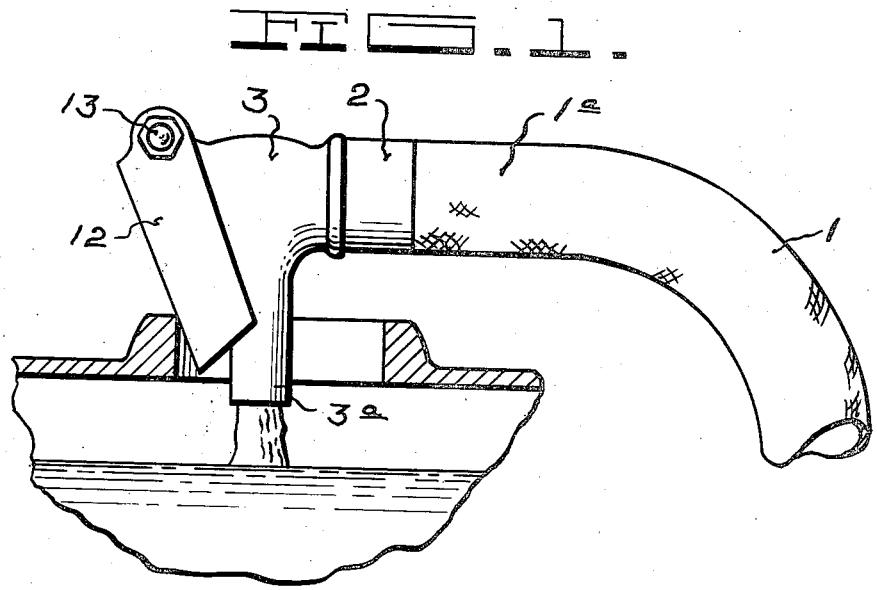
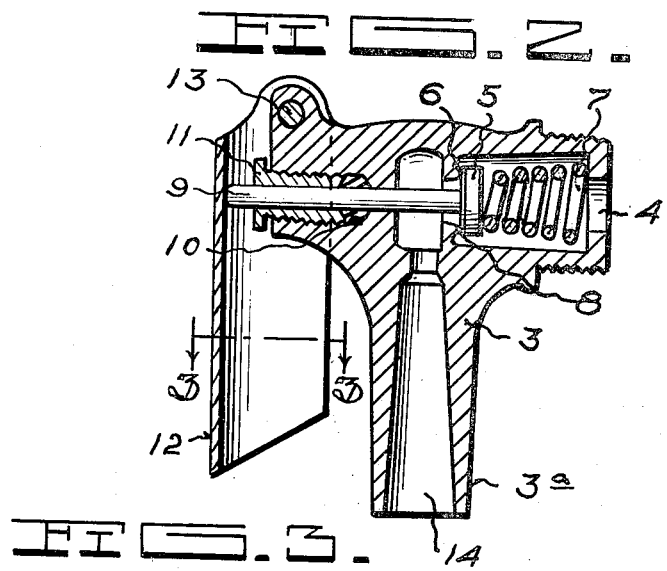
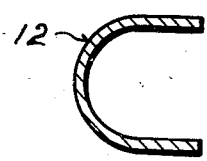
Lee Oliver Groves
INVENTOR.
BY John M Spellman
ATTORNEY.

Patented Oct. 8, 1940

2,217,050

UNITED STATES PATENT OFFICE 2,217,050

FAUCET

Lee Oliver Groves, Tuscola, Tex.

Application October 15, 1938, Serial No. 235,178

2 Claims. (Cl. 251—134)

This invention relates to faucets and it has particular reference to a faucet adaptable for use in the filling of the radiators of automobiles.

The principal object of the invention is to provide a faucet structure so arranged that water is positively prevented from being spilled onto the hood of the car.

Another object of the invention is to provide a faucet which will deliver water to an automobile radiator or other container by the simple process of inserting the nozzle of the faucet into an orifice, and manually exerting a force upon the faucet.

Yet another object of the invention is to provide a faucet structure so arranged that leakage is reduced to a minimum, and such leakage as does occur in operation will not be distributed upon the automobile hood or radiator.

Still another object of the invention is to provide a faucet having a spring-loaded valve so arranged that a positive seal is effected except when manually opened by the filling station operator.

A still further object of the invention is to provide a structure so arranged that it may be constructed at a minimum of cost and which structure is simple in construction and it may be readily assembled and dis-assembled for the replacement of the parts of the valve structure.

With the foregoing objects as paramount, the invention has particular reference to its salient features of construction and arrangement of parts which will become manifest as the descriptions proceeds, taken in connection with the accompanying drawing, wherein:

Figure 1 is a fragmentary elevational view of the invention shown in operative position.

Figure 2 is a view in vertical section of the faucet and,

Figure 3 is a view taken on the line 3—3 on Figure 2.

Referring primarily to Figure 1, the reference numeral 1 denotes a conventional hose which is preferably re-inforced throughout a portion 1a. A coupling 2 is arranged to be connected to the faucet.

The body portion 3 of the faucet is constructed as best shown in Figure 2. An opening 4 is provided for the liquid stream, which stream is checked in its flow by a plunger valve 5, when the device is not in operation. The valve 5 is urged against the seat 6 by a helical spring 7 and is provided with an annular ring 8 constructed of rubber or other resilient material.

A guide stem 9 is fixedly attached to the plunger valve 5 and is surrounded by a suitable packing 10, which packing is urged against the guide stem 9 by means of pressure exerted thereon by a packing nut 11.

A shield 12 is pivotally connected to the body portion 3 by means of a bolt 13. This bolt provides a means for removing the shield 12 when it is desired to tighten the packing nut 11.

Referring to Figure 2, it will be observed that a depending portion 3a is provided with an opening 14 through which the water is delivered to a radiator or other container.

In operation, the portion 3a of the body 3 is inserted into the radiator and a force is exerted by the operator which causes the structure to be moved into the position shown in Figure 1. When this occurs, the guide stem 9 which is attached to the valve 5 is moved against the action of the spring 7, so as to provide a passageway for the water from the hose into the radiator or other container.

Thus it will be seen that the device is operated only by a minimum force after its insertion, and that the shield 12 also prevents spilling and precludes the possibility of leakage past the packing to be distributed upon the hood of the automobile.

Manifestly, the construction illustrated and described is capable of considerable modification, and such modification as is considered within the scope of the appended claims is likewise considered within the spirit and intent of the invention.

What is claimed is:

1. A faucet comprising a body, one portion of the body of the faucet having an inlet passage and another portion of the body of the faucet having an outlet passage, the inlet portion of the faucet being at right angles to the outlet portion of the faucet, a valve interposed between said inlet and outlet passages, the valve having a valve stem projecting therefrom and extending through an aperture in the body of the faucet, a liquid shield pivotally secured to the body of the faucet and overlying the projecting end of the valve stem, the liquid shield adapted to be moved so as to engage the valve stem and move the valve to open position, a spring means positioned in the body of the faucet and adapted to return the valve to closed position, the liquid shield extending parallel with the outlet portion of the faucet and terminating above the lower end thereof to prevent liquid from being deposited in a zone other than the zone to be supplied with liquid.

2. A faucet comprising a body, one portion of the body of the faucet having an inlet passage and another portion of the body of the faucet having an outlet passage, the inlet portion of the faucet being at right angles to the outlet portion of the faucet, a valve interposed between said inlet and outlet passages, the valve having a valve stem projecting therefrom, a liquid shield pivotally secured to the body of the faucet and overlying the projecting end of the valve stem, the liquid shield adapted to be moved so as to engage the valve stem and move the valve to open position and being substantially parallel with the outlet portion of the faucet to prevent liquid from being deposited in a zone other than the zone to be supplied with liquid.

LEE OLIVER GROVES.